United States Patent
Twede (10) Patent No.: US 11,204,508 B2
(45) Date of Patent: *Dec. 21, 2021

(54) MULTIPLE BAND MULTIPLE POLARIZER OPTICAL DEVICE

(71) Applicant: Lockheed Martin Corporation, Bethesda, MD (US)

(72) Inventor: David R. Twede, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 714 days.

This patent is subject to a terminal disclaimer.

(21) Appl. No.: 15/410,463

(22) Filed: Jan. 19, 2017

(65) Prior Publication Data

US 2018/0203246 A1  Jul. 19, 2018

(51) Int. Cl.
*G02B 27/28* (2006.01)
*G01J 3/36* (2006.01)
(Continued)

(52) U.S. Cl.
CPC .............. *G02B 27/288* (2013.01); *G01J 3/36* (2013.01); *G01J 3/447* (2013.01); *H04N 5/33* (2013.01);
(Continued)

(58) Field of Classification Search
CPC ...... H04N 5/33; G01J 3/36; G01J 2003/2826; G01J 2003/1213; G01J 3/447; G02B 27/28; G02B 5/30
See application file for complete search history.

(56) References Cited

U.S. PATENT DOCUMENTS 4,790,654 A   12/1988   Clarke
4,991,941 A *  2/1991   Kalmanash ....... G02F 1/133533
                                              349/117
(Continued)

FOREIGN PATENT DOCUMENTS

JP        2009218237 A     9/2009

OTHER PUBLICATIONS

Kenton, A. C., et al., "Detection of Land Mines with Hyperspectral Data," Proceedings of the SPIE Conference on Detection and Remediation Technologies for Mines and Minelike Targets IV, Apr. 2, 1999, Orlando, Florida, USA, pp. 917-928.
(Continued)

*Primary Examiner* — Jeremiah C Hallenbeck-Huber
(74) *Attorney, Agent, or Firm* — Withrow & Terranova, PLLC (57) ABSTRACT

An optical device is disclosed. The optical device has an optical path and includes a first polarizing filter positioned in the optical path that is configured to receive electromagnetic radiation (EMR) from a scene and to transmit a first subset of EMR comprising EMR in a first waveband that has a first polarization orientation and EMR in a second waveband. A second polarizing filter is positioned in the optical path downstream of the first polarizing filter that is configured to receive the first subset of EMR and to transmit a second subset of EMR comprising EMR in the second waveband that has a second polarization orientation and the EMR in the first waveband that has the first polarization orientation.

22 Claims, 7 Drawing Sheets
(2 of 7 Drawing Sheet(s) Filed in Color)

(51) Int. Cl.
*H04N 5/33* (2006.01)
*G01J 3/447* (2006.01)
*G01J 3/12* (2006.01)
*G01J 3/28* (2006.01)

(52) U.S. Cl.
CPC ............... *G01J 2003/1213* (2013.01); *G01J 2003/2826* (2013.01)

(56) References Cited

U.S. PATENT DOCUMENTS

| | | | |
|---|---|---|---|
| 5,575,438 A | 11/1996 | McGonigle et al. | |
| 5,742,333 A * | 4/1998 | Faris | H04N 13/398 |
| | | | 348/60 |
| 6,009,340 A | 12/1999 | Hsia | |
| 6,765,617 B1 | 7/2004 | Tangen et al. | |
| 7,447,335 B1 | 11/2008 | Quintana et al. | |
| 7,718,968 B1 | 5/2010 | Murguia | |
| 8,760,494 B1 | 6/2014 | Twede | |
| 2002/0017612 A1 | 2/2002 | Yu et al. | |
| 2004/0135881 A1 | 7/2004 | Jones et al. | |
| 2005/0098713 A1 | 5/2005 | Holland | |
| 2005/0262995 A1 | 12/2005 | Kilkis | |
| 2006/0066738 A1 | 3/2006 | Hershey et al. | |
| 2006/0173351 A1 * | 8/2006 | Marcotte | A61B 17/3403 |
| | | | 600/473 |
| 2007/0090280 A1 * | 4/2007 | Harding | G01B 11/2509 |
| | | | 250/225 |
| 2007/0200977 A1 * | 8/2007 | Egi | G02F 1/133533 |
| | | | 349/96 |
| 2008/0094609 A1 * | 4/2008 | Ragucci | G01B 11/168 |
| | | | 356/34 |
| 2009/0201487 A1 | 8/2009 | Paluszek et al. | |
| 2010/0145416 A1 | 6/2010 | Kang et al. | |
| 2010/0157298 A1 | 7/2010 | Hayter et al. | |
| 2010/0284073 A1 * | 11/2010 | Iler | G02B 5/3058 |
| | | | 359/485.05 |
| 2011/0058038 A1 | 3/2011 | Twede | H04N 9/0451 |
| | | | 348/148 |
| 2011/0089323 A1 | 4/2011 | Treado et al. | |
| 2011/0242328 A1 | 10/2011 | Twede et al. | |
| 2012/0119089 A1 | 5/2012 | Sanchez del Rio Saez et al. | |
| 2012/0138514 A1 | 6/2012 | Janssens et al. | |
| 2013/0250297 A1 * | 9/2013 | Ito | G01N 21/9501 |
| | | | 356/369 |
| 2014/0347570 A1 * | 11/2014 | Osterman | G02F 1/133533 |
| | | | 349/2 |
| 2014/0362331 A1 * | 12/2014 | Shi | G02F 1/13363 |
| | | | 349/117 |
| 2015/0062399 A1 * | 3/2015 | Ishihara | H04N 5/23264 |
| | | | 348/302 |
| 2015/0138534 A1 | 5/2015 | Tidhar | |
| 2016/0037089 A1 * | 2/2016 | Silny | H04N 5/332 |
| | | | 250/332 |
| 2016/0124250 A1 * | 5/2016 | Schonbrun | G02B 5/3083 |
| | | | 348/336 |
| 2018/0100799 A1 | 4/2018 | Price et al. | |

OTHER PUBLICATIONS

International Search Report and Written Opinion for International Patent Application No. PCT/US2018/014413, dated Jun. 21, 2018, 9 pages.
Non-Final Office Action for U.S. Appl. No. 13/080,419 dated May 3, 2013, 9 pages.
Final Office Action and Applicant-Initiated Interview Summary for U.S. Appl. No. 13/080,419 dated Aug. 12, 2013, 13 pages.
Advisory Action for U.S. Appl. No. 13/080,419 dated Dec. 4, 2013, 3 pages.
Non-Final Office Action for U.S. Appl. No. 13/100,772 dated Mar. 15, 2013, 21 pages.
Final Office Action for U.S. Appl. No. 13/100,772 dated Sep. 16, 2013, 27 pages.
Notice of Allowance for U.S. Appl. No. 13/100,772 dated Feb. 13, 2014, 11 pages.
Gritz, David N., "Near-Infrared (IR) Polarizing Glass," Proceedings of SPIE 750, Infrared Systems and Components, Sep. 10, 1987, SPIE, 3 pages.
Hecht, Eugene, "Chapter 8: Polarization," Optics (book), Second Edition, 1990, Addison-Wesley, pp. 270-326.
Preston et al., "Development of a Field-Portable Multispectral Imaging and Classification System," ASPRS/ACSM Annual Convention and Exposition, Apr. 25-28, 1994, vol. 2, pp. 156-167.
Stolper et al., The Design and Evaluation of a Multi-Spectral Imaging Camera for the Inspection of Transmission Lines and Substation Equipment, Eksom, South Africa, 14 pages.
Stookey, S. D. et al., "Selective Polarization of Light Due to Absorption by Small Elongated Silver Particles in Glass," Applied Optics, vol. 7, Issue 5, May 1968, The Optical Society, pp. 777-779.
Yu, X. J. et al., "Optical wire-grid polarizers at oblique angles of incidence," Journal of Applied Physics, vol. 93, Issue 8, Apr. 15, 2003, American Institute of Physics, pp. 4407-4412.
Non-Final Office Action for U.S. Appl. No. 16/107,435, dated Jan. 23, 2020, 8 pages.
Notice of Allowance for U.S. Appl. No. 16/107,435, dated May 6, 2020, 7 pages.
International Preliminary Report on Patentability for International Patent Application No. PCT/US2018/014413, dated Aug. 1, 2019, 6 pages.

* cited by examiner

MULTIPLE BAND MULTIPLE POLARIZER OPTICAL DEVICE

The present application is being filed with color versions of the drawings discussed and referenced in this disclosure. Color drawings more fully disclose the subject matter disclosed herein.

TECHNICAL FIELD

The embodiments relate generally to gathering electromagnetic radiation (EMR) from a scene and, in particular, to a multiple band multiple polarizer optical device that separates the EMR received from a scene into different bands utilizing polarization orientation characteristics of the EMR.

BACKGROUND

Unpolarized electromagnetic radiation (EMR) can become partially, or completely, polarized after being reflected off of, or emitted from, a surface based on the angle of incidence of the unpolarized EMR with respect to the reflecting surface, or with respect to the surface EMR emission angle, relative to the observing detector.

SUMMARY

The embodiments receive electromagnetic radiation (EMR) from a scene, separate wavebands of the EMR based on polarization orientations, and pass the multiple wavebands with different polarization orientations to a sensor device for imaging. Among other applications, the embodiments facilitate the detection of objects in a scene by, in part, separating color components from different surfaces based on polarization orientations, resulting in visual distinctions between such surfaces that are not otherwise distinctive.

In one embodiment, a system is provided. The system includes an optical device having an optical path. The system also includes a first polarizing filter positioned in the optical path that is configured to receive EMR from a scene and to transmit a first subset of EMR comprising EMR in a first waveband that has a first polarization orientation and EMR in a second waveband. The system also includes a second polarizing filter positioned in the optical path downstream of the first polarizing filter that is configured to receive the first subset of EMR and to transmit a second subset of EMR comprising EMR in the second waveband that has a second polarization orientation and the EMR in the first waveband that has the first polarization orientation.

In another embodiment, a method is provided. The method includes receiving, by a first polarizing filter, EMR from a scene. The method further includes filtering, by the first polarizing filter, the EMR to transmit a first subset of EMR, the first subset of EMR comprising EMR in a first waveband that has a first polarization orientation and EMR in a second waveband irrespective of polarization orientation. The method further includes receiving, by a second polarizing filter, the first subset of EMR and filtering, by the second polarizing filter, the first subset of EMR to transmit a second subset of EMR, the second subset of EMR including EMR in the second waveband that has a second polarization orientation and EMR in the first waveband that has the first polarization orientation.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first subset" and "second subset," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified.

In accordance with Brewster's law, unpolarized electromagnetic radiation (EMR) can become partially, or completely, polarized after being reflected off of, or emitted from, a surface based on the angle of the surface relative to the observing detector. The embodiments receive EMR from a scene, whether reflected or emitted, filter separate wavebands of the EMR based on respective polarization orientations, and pass the multiple wavebands with different polarization orientations to a sensor device for imaging. The embodiments have applicability in a wide range of applications, including, by way of non-limiting example, identifying objects in a scene. Separating the wavebands of EMR based on polarization orientation can cause surfaces, or objects, that may have the same or similar color as surrounding surfaces to be easily visually distinguishable from such surrounding surfaces according to the polarization of the separate wavebands of EMR, the polarization being dependent on their relative orientation to the observing detector.

Figure 1:
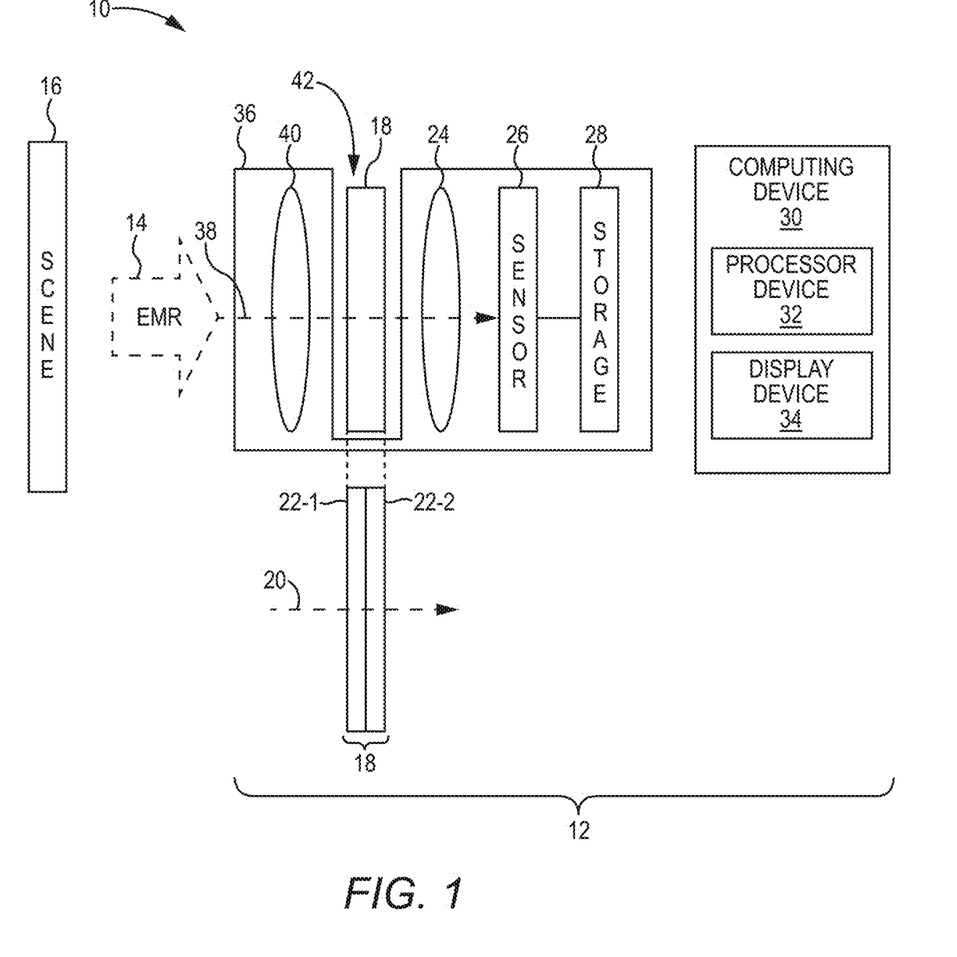
FIG. 1 is a block diagram of an environment in which embodiments may be practiced.

FIG. 1 is a block diagram of an environment 10 in which embodiments may be practiced. The environment 10 includes a system 12 that receives EMR 14 from a scene 16. The EMR 14 may comprise EMR in any waveband, including, by way of non-limiting example, a visible waveband in a visible spectrum ranging from about 380 nanometers (nm) to about 700 nm, and an infrared waveband in an infrared spectrum ranging from about 700 nm to about 1 millimeter (mm). The phrase "scene" as used herein refers to the source of the EMR gathered by the system 12, and may in some embodiments be defined at least in part by a field of view (FOV) associated with the system 12. The scene 16 may comprise, for example, a portion of landscape within the FOV of the system 12, may comprise an apparatus or device within the FOV of the system 12, may comprise an appendage of a human within the FOV of the system 12, or any other thing or object depending on the particular field of application of the system 12, as discussed in greater detail herein.

The system 12 includes an optical device 18 that includes an optical path 20 along which the EMR 14 travels. In one embodiment, the optical device 18 includes a first polarizing filter 22-1 positioned in the optical path 20 that is configured to receive the EMR 14 from the scene 16 and to transmit a first subset of EMR comprising EMR in a first waveband that has a first polarization orientation and EMR in a second waveband. For example, the first waveband may comprise a blue waveband of EMR comprising EMR having a wavelength in a range between about 450 nm and 495 nm (referred to herein as blue EMR for the sake of brevity), and the EMR in the second waveband may include a red waveband comprising EMR having a wavelength in a range between about 625 nm and 675 nm (referred to herein as red EMR for the sake of brevity). The first polarization orientation may comprise, for example, a vertical polarization orientation. Thus, in this example, the first polarizing filter 22-1 passes blue EMR that has a vertical polarization orientation and blocks blue EMR that has a polarization other than the vertical polarization orientation. The first polarizing filter 22-1 also passes red EMR irrespective of polarization orientation.

The optical device 18 includes a second polarizing filter 22-2 positioned in the optical path 20 downstream of the first polarizing filter 22-1. The second polarizing filter 22-2 is configured to receive the first subset of EMR from the first polarizing filter 22-1 and to transmit a second subset of EMR including EMR in the second waveband that has a second polarization orientation and including the EMR in the first waveband that has the first polarization orientation. In this example, the second polarization orientation may comprise a horizontal orientation, and thus, the second polarizing filter 22-2 transmits red EMR that has a horizontal polarization orientation and blocks red EMR having a polarization other than the horizontal polarization orientation. The second polarizing filter 22-2 also transmits the blue EMR irrespective of polarization orientation.

The first polarizing filter 22-1 and the second polarizing filter 22-2 may be referred to generally herein as polarizing filters 22. The phrase "transmit" as used herein in conjunction with a polarizing filter 22 refers to the transmission by the polarizing filter 22 of EMR that has passed through the polarizing filter 22, and does not imply active electronics that actively transmit EMR.

The second subset of EMR thus, in this example, comprises vertically polarized blue EMR, horizontally polarized red EMR, and may also include other wavebands of any polarization orientation. The second subset of EMR may pass through one or more lens arrangements 24 and then impinge upon a sensor device 26. The sensor device 26 comprises a plurality of detector elements sensitive to EMR in the first waveband and EMR in the second waveband, which, in this example, are in the visible wavebands of blue EMR and red EMR. Thus, the sensor device 26 may comprise, for example, a complimentary metal-oxide semiconductor (CMOS) or a charge-coupled device (CCD) sensor device. In other embodiments, such as embodiments that operate in the infrared wavebands, the sensor device 26 may comprise a focal plane array (FPA), for example. The sensor device 26 is also configured to distinguish the EMR in the first waveband from the EMR in the second waveband. For example, the sensor device 26 may include, or may be downstream of, a color filter array such as a Bayer filter mosaic, or other color separating mechanisms, such as spectral dispersive elements, notch filters, bandpass filters, and the like. The sensor device 26 may have any desired resolution, such as a 1024×1024 grid of 1,048,576 detector elements.

The sensor device 26 generates sensor data that characterizes the EMR impinging on the detector elements and may store the sensor data in a storage 28. In some embodiments, the system 12 may include a computing device 30 that includes a processor device 32 and a display device 34. In one embodiment, the processor device 32 may generate an image based on the sensor data, and cause presentation of the image on the display device 34. As will be illustrated below, the separation of different wavebands based on polarization orientation may facilitate substantial visual distinctions between objects, or surfaces of the same objects, that would otherwise appear very similar in color to the naked human eye.

The system 12 may include a body 36 that maintains a number of components along an optical path 38. An objective lens 40 may be positioned in the body 36 to receive the EMR 14 from the scene 16. The EMR 14 may then travel downstream to the optical device 18. Note that the optical device 18 may be placed at any location along the optical path 38, including at a pupil plane or an image plane. In some embodiments, the optical device 18 may be constructed with a frame that can be detachably inserted into a receiver 42 of the body 36. In this manner, a particular optical device 18 that operates in two (or more) desired wavebands with desired polarization orientations may be inserted into the body 36, depending on the particular application.

In some embodiments, the first polarizing filter 22-1 is fixed with respect to the second polarizing filter 22-2. In some embodiments, the first polarizing filter 22-1 may be coupled directly to the second polarizing filter 22-2 via an adhesive, or the like. In other embodiments, the first polarizing filter 22-1 may be movable with respect to the second polarizing filter 22-2. In some embodiments, the polarization orientation of the first polarizing filter 22-1 may be movable with respect to the second polarizing filter 22-2. For example, the polarization orientation of the first polarizing filter 22-1 may be movable between a range of 90 degrees to 20 degrees with respect to the polarization orientation of the second polarizing filter 22-2, or within any other desired range. The first polarizing filter 22-1 and the second polarizing filter 22-2 may be sourced from any of a number of optics manufacturers, such as Edmund Optics Inc. located at 101 East Gloucester Pike, Barrington, N.J. 08007-1380, Deposition Sciences, Inc. located at 3300 Coffey Lane, Santa Rosa Calif. 95403, or MOXTEK, Inc. located at 452 W 1260 N, Orem, Utah 84057.

While for purposes of illustration the polarization orientations are discussed herein as being linear, the embodiments are not limited to linear polarization orientations, and have applicability to circular and elliptical polarization orientations as well. Thus, in scenes that may cause the generation of reflected EMR that has a circular polarization orientation, the polarizing filters 22-1, 22-2 may include a quarter waveplate phase retarder, or other device, that converts the circular polarization orientation to a linear polarization orientation, which is then passed by the respective polarizing filters 22-1, 22-2. For example, a waveplate of the first polarizing filter 22-1 may receive blue EMR having a right-hand circular polarization orientation, and convert the blue EMR having the right-hand circular polarization orientation to blue EMR having a vertical polarization orientation. The first polarizing filter 22-1 then receives the blue EMR having the vertical polarization orientation and transmits the blue EMR having the vertical polarization orientation, and blocks blue EMR having any other polarization orientation. Similarly, a waveplate of the second polarizing filter 22-2 may receive red EMR having a left-hand circular polarization orientation, and convert the red EMR having the left-hand circular polarization orientation to red EMR having a horizontal polarization orientation. The second polarizing filter 22-2 receives the red EMR having the horizontal polarization orientation, transmits the red EMR having the horizontal polarization orientation, and blocks red EMR having any other polarization orientation. The second polarizing filter 22-2 also transmits the blue EMR having any other polarization orientation.

Also, while the optical device 18 is illustrated herein as comprising only a single set of the first polarizing filter 22-1 and the second polarizing filter 22-2, in some embodiments, the optical device 18 may be segmented, wherein each segment comprises a different set of a first polarizing filter 22 and a second polarizing filter 22, each different set operating with different wavebands and/or different polarization orientations. In other embodiments, the segments may comprise a single polarizing filter 22, each of which relates to a unique polarization orientation and a unique waveband.

Figure 2:
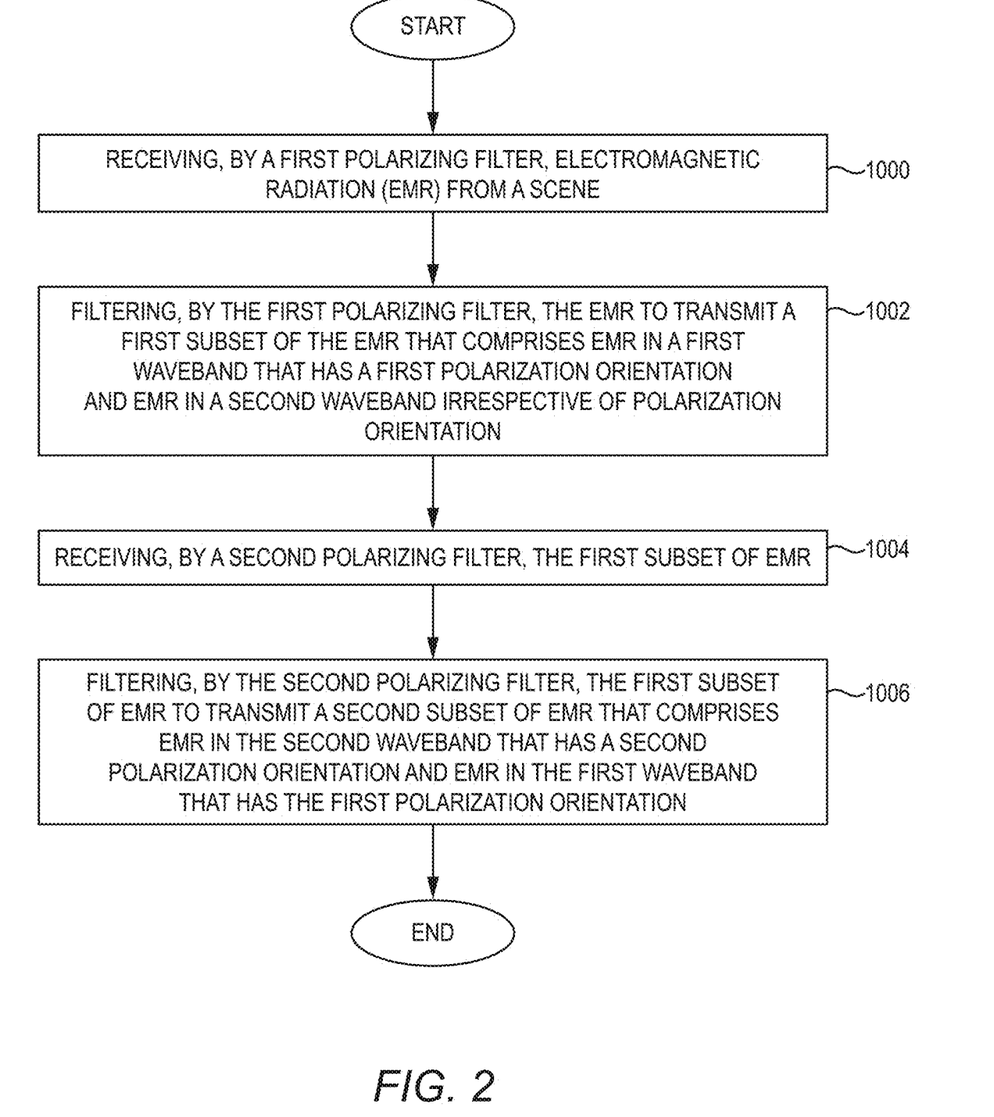
FIG. 2 is a flowchart of a method for separating two wavebands of electromagnetic radiation (EMR) based on polarization orientation according to one embodiment.

FIG. 2 is a flowchart of a method for separating two wavebands of EMR based on polarization orientation, according to one embodiment. FIG. 2 will be discussed in conjunction with FIG. 1. The first polarizing filter 22-1 receives the EMR 14 from the scene 16 (FIG. 2, block 1000). The first polarizing filter 22-1 filters the EMR 14 to pass a first subset of the EMR 14 that comprises EMR in a first waveband that has a first polarization orientation and EMR in a second waveband irrespective of polarization orientation (FIG. 2, block 1002). The second polarizing filter 22-2 receives the first subset of EMR 14 and filters the first subset of EMR 14 to pass a second subset of EMR comprising EMR in the second waveband that has a second polarization orientation and EMR in the first waveband that has the first polarization orientation (FIG. 2, blocks 1004-1006).

Figure 3:
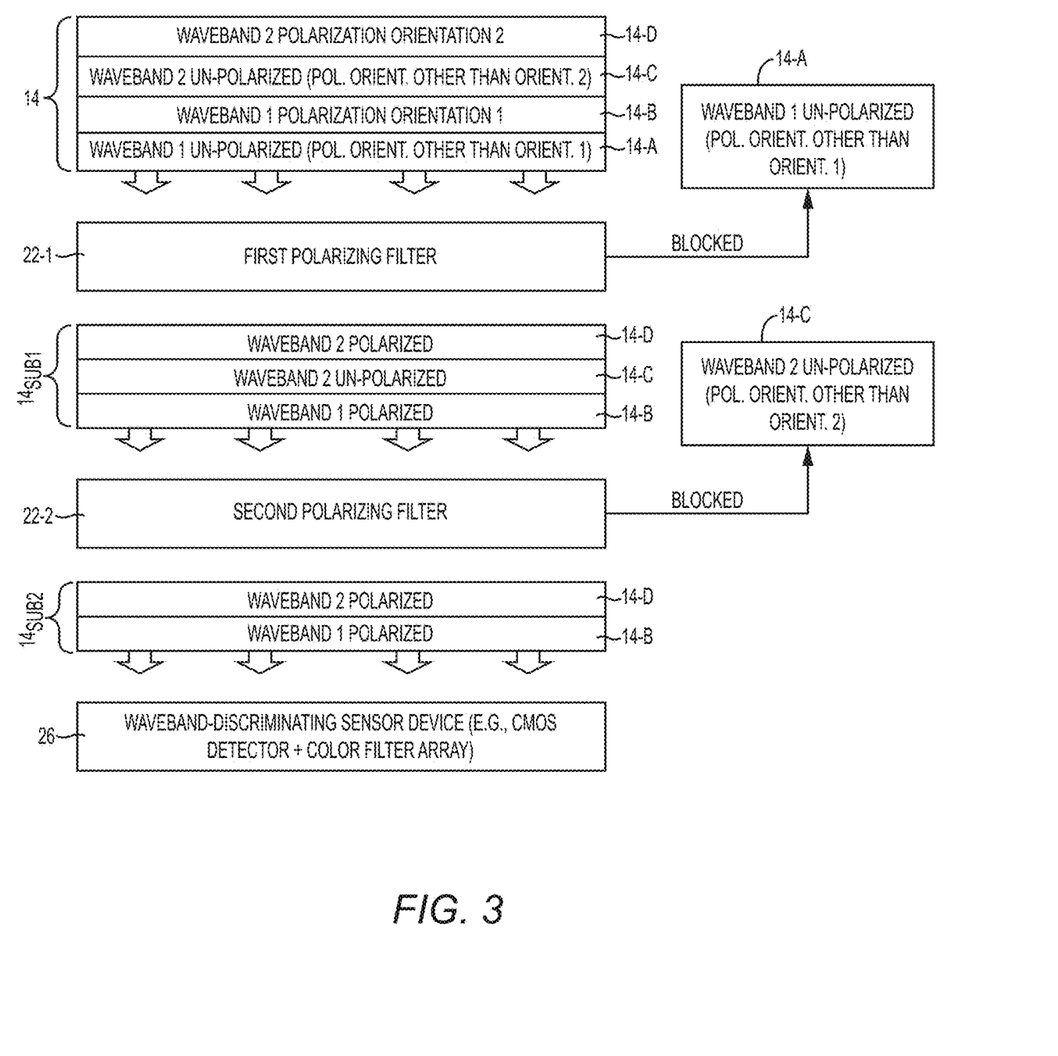
FIG. 3 is a block diagram illustrating filtering aspects of an optical device illustrated in FIG. 1 according to one embodiment.

FIG. 3 is a block diagram illustrating filtering aspects of the optical device 18 according to one embodiment. The EMR 14 will be discussed herein in terms of groups of the EMR 14, some of which include some percentage of EMR 14 in a particular waveband that is polarized in a particular polarization orientation, and some of which include some percentage of EMR in the particular waveband that is not polarized or is polarized in some other polarization orientation, which may also be referred to herein as being unpolarized. Thus, the EMR 14 includes EMR 14-A that comprises EMR in the first waveband having any polarization orientation other than the first polarization orientation (i.e., unpolarized EMR), EMR 14-B including EMR in the first waveband having the first polarization orientation, EMR 14-C including EMR in the second waveband having any polarization orientation other than the second polarization orientation, and EMR 14-D including EMR in the first second waveband having the second polarization orientation. The EMR 14 may also include EMR in other wavebands having any polarization orientation (not illustrated for purposes of clarity).

The first polarizing filter 22-1 transmits a first subset of EMR $14_{SUB1}$ downstream, and blocks the EMR 14-A comprising EMR in the first waveband having any polarization orientation other than the first polarization orientation. The first subset of EMR $14_{SUB1}$ thus includes the EMR 14-B, the EMR 14-C, and the EMR 14-D. The second polarizing filter 22-2 transmits a second subset of EMR $14_{SUB2}$ downstream, and blocks the EMR 14-C comprising EMR in the second waveband having any polarization orientation other than the second polarization orientation. The second subset of EMR $14_{SUB2}$ thus comprises the EMR 14-B and the EMR 14-D.

While for purposes of illustration the two polarization orientations have been described as vertical and horizontal, the embodiments are not limited to vertical polarization orientations and horizontal polarization orientations, and may comprise any two polarization orientations that differ from one another by sufficient angles, such as 45 degrees, 60 degrees, or 90 degrees. Additionally, polarization orientations may include circular or elliptical polarizations and may include any phase angle differences between the orthogonal components of the transverse electromagnetic fields.

The embodiments have applicability to any wavebands, including, by way of non-limiting example, any visible wavebands such as wavebands in the visible spectrum ranging from about 380 nanometers (nm) to about 700 nm, and any infrared wavebands in the infrared spectrum ranging from about 700 nm to about 1 millimeter (mm). For example, the first waveband may comprise a blue waveband, and the second waveband may comprise a yellow waveband. The first waveband may comprise a red waveband and the second waveband may comprise a yellow waveband. The first waveband may comprise a first infrared waveband within an infrared spectrum ranging from about 700 nm to about 1 millimeter (mm), and the second waveband may comprise a second infrared waveband within the infrared spectrum, the second infrared waveband being a different waveband within the infrared spectrum than the first infrared waveband. The first infrared waveband may comprise a waveband within a short-wave infrared spectrum ranging from about 1 micrometer (μm) to about 3 μm, and the second infrared waveband may comprise a waveband within a mid-wave infrared spectrum ranging from about 3 μm to about 8 μm. The first infrared waveband may comprise a waveband within a mid-wave infrared spectrum ranging from about 3 μm to about 8 μm, and the second infrared waveband may comprise a waveband within a long-wave infrared spectrum ranging from about 8 μm to about 15 μm. The first infrared waveband may comprise a waveband within a short-wave infrared spectrum ranging from about 1 μm to about 3 μm, and the second infrared waveband may comprise a waveband within a near-infrared spectrum ranging from about 700 nm to about 1 µm. Any combination of wavebands discussed above is also possible.

Figure 4:
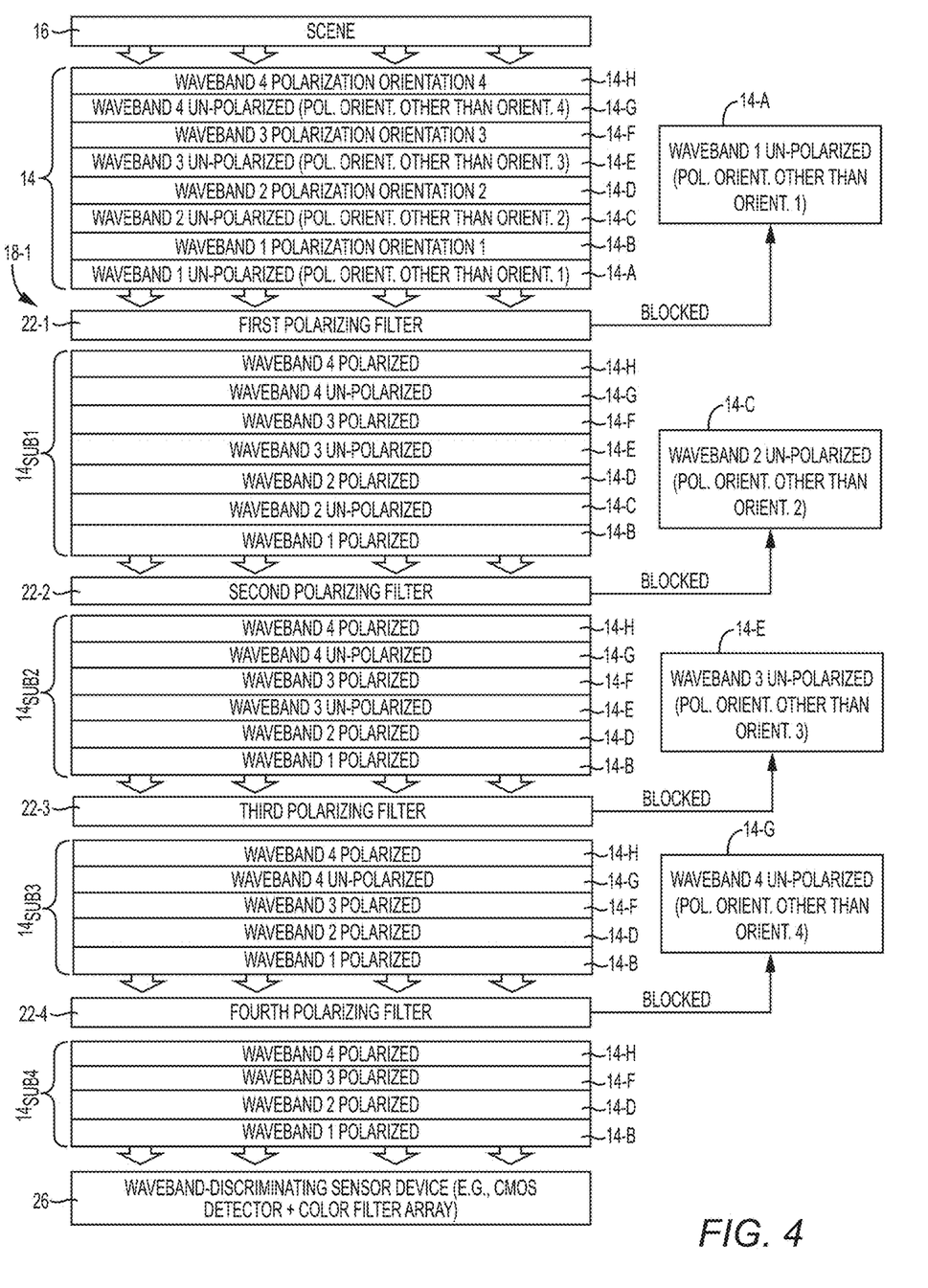
FIG. 4 is a block diagram illustrating filtering aspects of an optical device according to one embodiment.

FIG. 4 is a block diagram illustrating filtering aspects of an optical device 18-1 according to one embodiment. The optical device 18-1 is substantially similar to the optical device 18, except the optical device 18-1 includes a third polarizing filter 22-3 and a fourth polarizing filter 22-4. In this example, the EMR 14 includes the EMR 14-A comprising EMR in the first waveband having any polarization orientation other than the first polarization orientation, the EMR 14-B comprising EMR in the first waveband having the first polarization orientation, the EMR 14-C comprising EMR in the second waveband having any polarization orientation other than the second polarization orientation, and the EMR 14-D comprising EMR in the second waveband having the second polarization orientation. The EMR 14 also comprises EMR 14-E comprising EMR in a third waveband having any polarization orientation other than a third polarization orientation, EMR 14F comprising EMR in the third waveband having the third polarization orientation, EMR 14-G comprising EMR in a fourth waveband having any polarization orientation other than a fourth polarization orientation, and EMR 14H comprising EMR in the fourth waveband having the fourth polarization orientation.

By way of non-limiting example, the first polarization orientation may comprise a vertical polarization orientation and the second polarization orientation may comprise a horizontal polarization orientation that is 90 degrees from the vertical polarization orientation. The third polarization orientation may comprise a linear polarization that is 45 degrees from a linear orientation of the first polarization orientation and 45 degrees from a linear orientation of the second polarization orientation. Thus, if the first polarization orientation is at 0 degrees and the second polarization orientation is at 90 degrees, the third polarization orientation may be at 45 degrees. The fourth polarization orientation may comprise a linear orientation that is 45 degrees from the linear orientation of the first polarization orientation, 45 degrees from the linear orientation of the second polarization orientation, and 90 degrees from a linear orientation of the third polarization orientation. In the example above, the fourth polarization orientation may be at 135 degrees.

The third waveband may be another visible waveband, such as a yellow waveband of EMR comprising EMR having a wavelength in a range between about 570 nm and 590 nm (referred to herein as yellow EMR for the sake of brevity). The fourth waveband may also be another visible waveband, such as a green waveband of EMR comprising EMR having a wavelength in a range between about 495 nm and 570 nm (referred to herein as green EMR for the sake of brevity).

The first polarizing filter 22-1 transmits a first subset of EMR $14_{SUB1}$ downstream, and blocks the EMR 14-A comprising EMR in the first waveband having any polarization orientation other than the first polarization orientation. The first subset of EMR $14_{SUB1}$ thus comprises the EMR 14-B— the EMR 14-H. The second polarizing filter 22-2 transmits a second subset of EMR $14_{SUB2}$ downstream, and blocks the EMR 14-C. The second subset of EMR $14_{SUB2}$ thus comprises the EMR 14-B and the EMR 14-D—the EMR 14-H.

The third polarizing filter 22-3 transmits a third subset of EMR $14_{SUB3}$ downstream, and blocks the EMR 14-E. The third subset of EMR $14_{SUB3}$ thus comprises the EMR 14-B, the EMR 14-D, and the EMR 14-F—the EMR 14-H. The fourth polarizing filter 22-4 transmits a fourth subset of EMR $14_{SUB4}$ downstream, and blocks the EMR 14-G. The fourth subset of EMR $14_{SUB4}$ thus comprises the EMR 14-B, the EMR 14-D, the EMR 14-F, and the EMR 14-H.

The sensor device 26 receives the fourth subset of EMR $14_{SUB4}$, and generates sensor data that identifies the first through fourth wavebands, and their spatial locations within the scene 16.

Figure 5A:
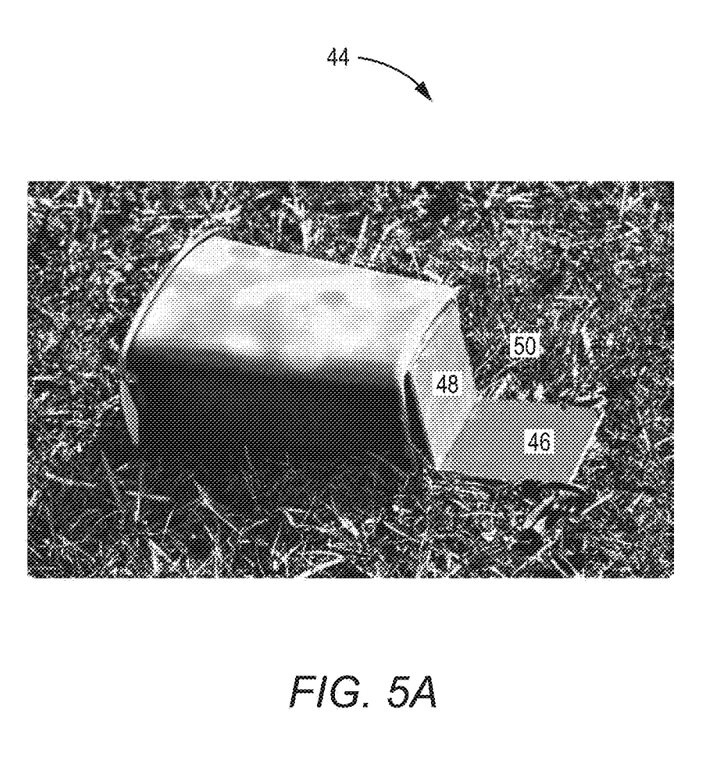
FIGS. 5A-5D are images that illustrate a scene according to one embodiment.

FIGS. 5A-5D are images that illustrate a scene 44. FIG. 5A illustrates in grayscale two panels 46, 48 positioned in grass 50. The panel 46 is in a generally horizontal plane, and the panel 48 is in a generally vertical plane. The panels 46, 48 are painted a green color that closely matches the grass 50 and, from a distance, are not easily visually distinguishable from the grass 50. FIG. 5A is an actual image captured by a conventional imaging device, such as a consumer camera, in which the optical device 18 was positioned over the aperture of the camera. The optical device 18 in this example had a first polarizing filter 22-1 that passes (i.e., transmits) blue EMR that has a vertical polarization orientation and red EMR irrespective of polarization orientation, and a second polarizing filter 22-2 that passes red EMR that has a horizontal polarization orientation, and that passes blue EMR irrespective of polarization orientation. FIG. 5A was generated based on the sensor data from the blue channel of the sensor device of the camera. In other words, FIG. 5A shows in grayscale the output of the blue channel of the sensor device of the camera. Note that the vertical panel 48 is substantially brighter than the horizontal panel 46 because the reflected radiance of the blue EMR that has the vertical polarization orientation from the vertical panel 48 is substantially greater than the reflected radiance of the blue EMR that has the vertical polarization orientation from the horizontal panel 46.

Figure 5B:
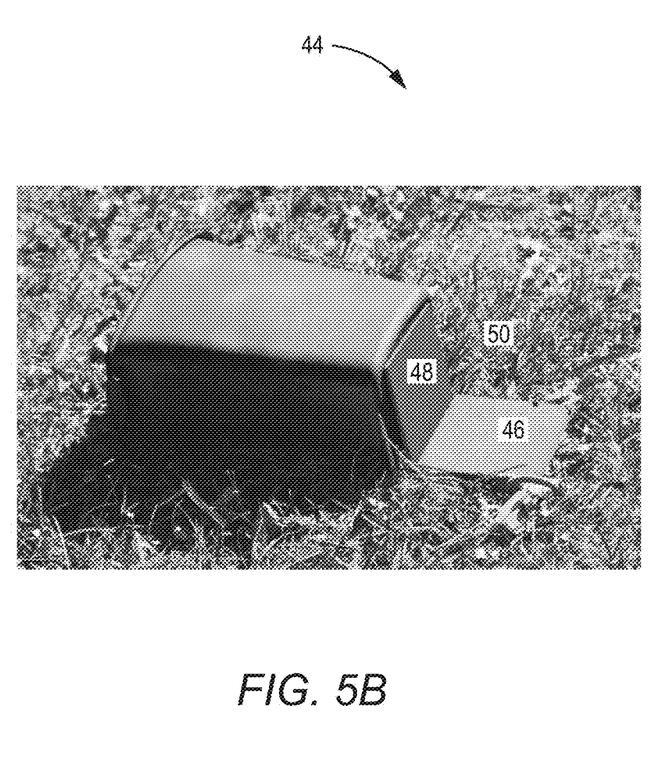

FIG. 5B is the same image as illustrated in FIG. 5A using optical device 18, however FIG. 5B shows in grayscale the output of the red channel of the sensor device of the camera. Note that in FIG. 5B the horizontal panel 46 is substantially brighter than the vertical panel 48 because the reflected radiance of the red EMR that has the horizontal polarization orientation from the horizontal panel 46 is substantially greater than the reflected radiance of the red EMR that has the horizontal polarization orientation from the vertical panel 48.

Figure 5C:
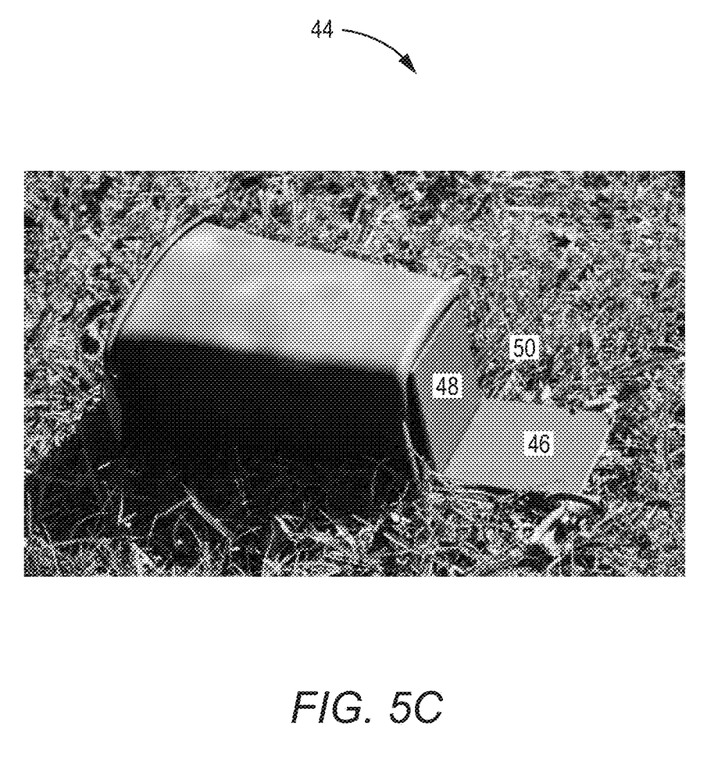
Figure 5D:
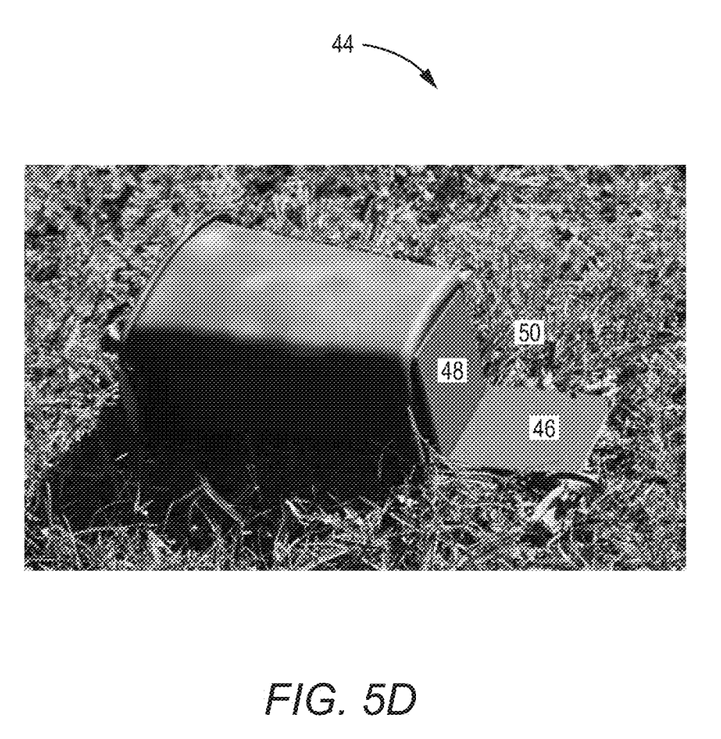

FIG. 5C illustrates the scene 44 illustrated in FIGS. 5A and 5B in color as captured via a conventional imaging device such as a camera without the optical device 18. The panels 46 and 48 are visually nearly identical to one another, and similar in color to the grass 50. FIG. 5D illustrates the scene 44 illustrated in FIGS. 5A, 5B and 5C in color with the optical device 18 installed in the optical path upstream of the sensor device in the camera. FIG. 5D was generated based on all three color channels (red, green and blue) of the sensor device. The panel 46 has a red-purple hue because the EMR reflected from the horizontal panel 46 contains a greater amount of red EMR having the horizontal polarization orientation than blue EMR having the vertical polarization orientation due to the horizontal plane of the panel 46. In contrast, the vertical panel 48 has a strong blue hue because the EMR reflected from the vertical panel 48 contains a greater amount of blue EMR having the vertical polarization orientation than red EMR having the horizontal polarization orientation due to the vertical plane of the panel 48. The panels 46, 48 are visually very distinguishable from one another due to the optical device 18. The panels 46, 48 are also visually very distinguishable from the grass 50.

Figure 6A:
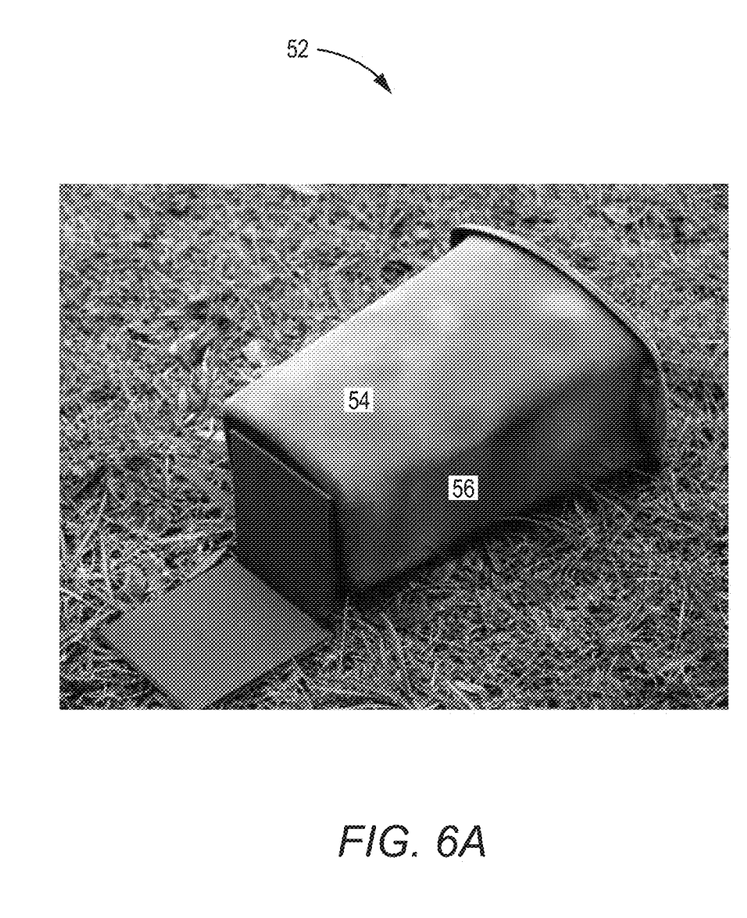
FIGS. 6A-6B are images that illustrate a different scene.
Figure 6B:
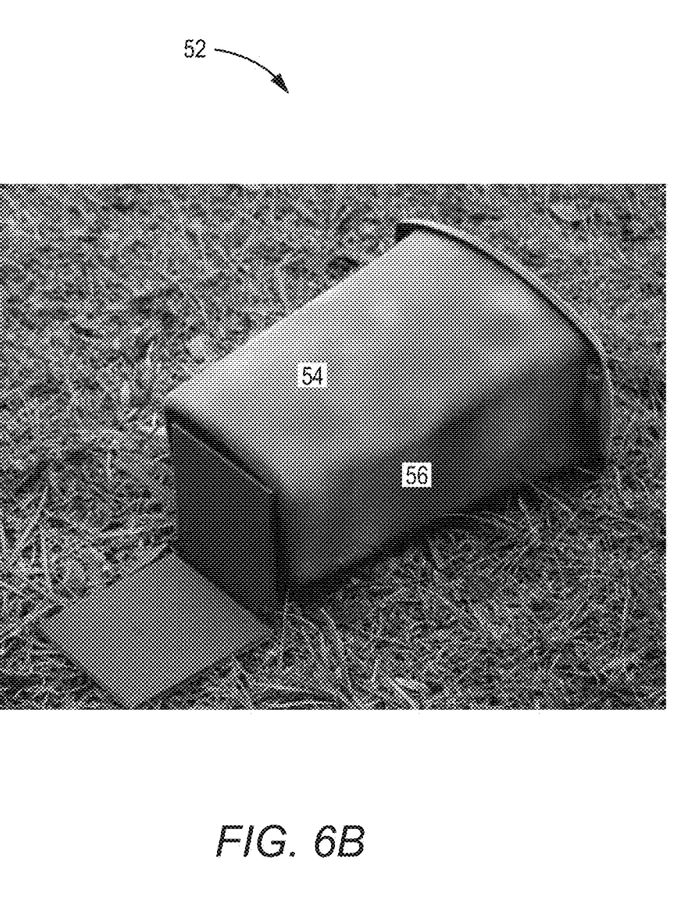

FIGS. 6A-6B are images that illustrate a scene 52. FIG. 6A illustrates the scene 52 in color as captured via a conventional imaging device such as a camera without the optical device 18. A horizontal surface 54 is somewhat lighter than a vertical surface 56 due to shade, but not otherwise visually distinguishable from the vertical surface 56. FIG. 6B illustrates the scene 52 in color as captured via a conventional imaging device such as a camera that had the optical device 18 installed in the optical path upstream of the sensor device in the camera. The horizontal surface 54 has a red-purple tint, while the vertical surface 56 has a bluish tint for the reasons discussed above with regard to FIGS. 5A-5D, making the horizontal surface 54 far more visually distinguishable from the vertical surface 56 compared to FIG. 6A.

The embodiments have applicability in a wide range of applications, including, by way of non-limiting example, imaging of manmade objects from natural vegetation backgrounds. Another application is the derivation of shape information of objects in a scene. In this example, the Stokes parameters (S0, S1, S2) can be used to derive angles from scene objects or scene facets, particularly including the tilt angle, which is √(S1^2+S2^2)/S0, and the azimuth angle, which is ½*atan(S2/S1). With the facet angles, one can derive a three-dimensional model of the scene without having multiple cameras (stereo-vision) and, from this, create a virtual reality from the scene shape information using thermal band polarization, for example.

Another application is in manufacturing. Analysis of polarization from surfaces can reveal stress and strain that alter surface angles and roughness. Using the Stokes parameters, one can evaluate changes in strain during manufacturing or operation of parts under stress.

Other applications include medical applications. Skin has elongated modes in certain axes, especially along limbs and longer areas of the body. Polarization can reveal defects in the skin during flex or movement of the skeletal-muscular frame.

Another application is a counter-aerial platform application. The sky polarization changes gradually across a wide angle of the total sky dome. A small man-made object such as an aerial drone (or a larger one at further range, such as a manned aircraft) will present a different polarization across the body of the air-vehicle, than that of the sky or the clouds.

Another application is security tracking. Covert polarized tags can be used to covertly track objects through various geographical points. The tag can contain polarization signatures that are not easily seen by the eye or even single-angle polarized sunglasses, but can be detected using multiple polarization angles in a single filter.

Another application is authentication tags. Similar to the security tracking application discussed above, a difficult-to-counterfeit tag may be constructed using special polarization dyes and patterns not readily visible to the common observer but discerned by a camera with the filter described in this patent.

Those skilled in the art will recognize improvements and modifications to the preferred embodiments of the disclosure. All such improvements and modifications are considered within the scope of the concepts disclosed herein and the claims that follow.

What is claimed is:

1. A system comprising:
   an optical device having an optical path, the optical device comprising:
   a first polarizing filter positioned in the optical path, the first polarizing filter being configured to receive electromagnetic radiation (EMR) from a scene and to transmit a first subset of EMR comprising EMR in a first waveband that has a first polarization orientation and EMR in a second waveband irrespective of polarization orientation;
   a second polarizing filter positioned in the optical path downstream of the first polarizing filter, the second polarizing filter being configured to receive the first subset of EMR and to transmit a second subset of EMR comprising EMR in the second waveband that has a second polarization orientation and the EMR in the first waveband that has the first polarization orientation; and
   a sensor device comprising a plurality of detector elements sensitive to EMR in the first waveband and EMR in the second waveband, the sensor device configured to distinguish the EMR in the first waveband from the EMR in the second waveband.

2. The system of claim 1 wherein the optical device further comprises a third polarizing filter positioned in the optical path, the third polarizing filter being configured to receive the second subset of EMR and to transmit a third subset of EMR comprising EMR in a third waveband that has a third polarization orientation and to transmit the EMR in the first waveband that has the first polarization orientation and the EMR in the second waveband that has the second polarization orientation.

3. The system of claim 2 wherein the optical device further comprises a fourth polarizing filter positioned in the optical path, the fourth polarizing filter being configured to receive the third subset of EMR and to transmit a fourth subset of EMR comprising EMR in a fourth waveband that has a fourth polarization orientation and to transmit the EMR in the first waveband that has the first polarization orientation, the EMR in the second waveband that has the second polarization orientation, and the EMR in the third waveband that has the third polarization orientation.

4. The system of claim 3 wherein the first polarization orientation comprises a linear orientation that is 90 degrees from a linear orientation of the second polarization orientation.

5. The system of claim 4 wherein the third polarization orientation comprises a linear orientation that is 45 degrees from a linear orientation of the first polarization orientation and 45 degrees from the linear orientation of the second polarization orientation.

6. The system of claim 5 wherein the fourth polarization orientation comprises a linear orientation that is 45 degrees from the linear orientation of the first polarization orientation, 45 degrees from the linear orientation of the second polarization orientation, and 90 degrees from a linear orientation of the third polarization orientation.

7. The system of claim 1 further comprising a lens arrangement.

8. The system of claim 1 wherein the system further comprises an image plane, and wherein the optical device is positioned at the image plane.

9. The system of claim 1 wherein the system further comprises a pupil plane, and wherein the optical device is positioned at the pupil plane.

10. The system of claim 1 wherein the first polarization orientation comprises a linear orientation that is 90 degrees from a linear orientation of the second polarization orientation.

11. The system of claim 1 wherein the first waveband comprises a first visible waveband within a visible spectrum ranging from about 380 nanometers (nm) to about 700 nm, and the second waveband comprises a second visible waveband within the visible spectrum, the second visible waveband being a different waveband within the visible spectrum than the first visible waveband.

12. The system of claim 1 wherein the first waveband comprises a first infrared waveband within an infrared spectrum ranging from about 700 nm to about 1 millimeter (mm), and the second waveband comprises a second infrared waveband within the infrared spectrum, the second infrared waveband being a different waveband within the infrared spectrum than the first infrared waveband.

13. The system of claim 12 wherein the first infrared waveband comprises a waveband within a short-wave infrared spectrum ranging from about 1 micrometer (μm) to about 3 μm, and the second infrared waveband comprises a waveband within a mid-wave infrared spectrum ranging from about 3 μm to about 8 μm.

14. The system of claim 12 wherein the first infrared waveband comprises a waveband within a mid-wave infrared spectrum ranging from about 3 μm to about 8 μm, and the second infrared waveband comprises a waveband within a long-wave infrared spectrum ranging from about 8 μm to about 15 μm.

15. The system of claim 12 wherein the first infrared waveband comprises a waveband within a short-wave infrared spectrum ranging from about 1 μm to about 3 μm, and the second infrared waveband comprises a waveband within a near-infrared spectrum ranging from about 700 nm to about 1 μm.

16. The system of claim 1 wherein the first polarizing filter is fixed with respect to the second polarizing filter.

17. The system of claim 1 wherein the first polarizing filter is coupled to the second polarizing filter.

18. The method of claim 1 wherein the first polarizing filter is configured to transmit a third subset of EMR in a third waveband irrespective of polarization orientation, and the second polarizing filter is configured to receive the third subset of EMR, and pass the third subset of EMR irrespective of polarization orientation.

19. A method comprising:
receiving, by a first polarizing filter, electromagnetic radiation (EMR) from a scene;
filtering, by the first polarizing filter, the EMR to transmit a first subset of EMR, the first subset of EMR comprising EMR in a first waveband that has a first polarization orientation and EMR in a second waveband irrespective of polarization orientation;
receiving, by a second polarizing filter, the first subset of EMR;
filtering, by the second polarizing filter, the first subset of EMR to transmit a second subset of EMR, the second subset of EMR comprising EMR in the second waveband that has a second polarization orientation, and EMR in the first waveband that has the first polarization orientation;
receiving, by a sensor device comprising a plurality of detector elements, the EMR in the second waveband that has the second polarization orientation and the EMR in the first waveband that has the first polarization orientation; and
generating sensor data that identifies the EMR in the second waveband that has the second polarization orientation and the EMR in the first waveband that has the first polarization orientation.

20. The method of claim 19 further comprising:
receiving, by a processor device, the sensor data;
generating, by the processor device, an image based on the sensor data; and
causing presentation of the image on a display device.

21. A system comprising:
an optical device having an optical path, the optical device comprising:
a first polarizing filter positioned in the optical path, the first polarizing filter being configured to receive electromagnetic radiation (EMR) from a scene and to transmit a first subset of EMR comprising EMR in a first waveband that has a first polarization orientation and EMR in a second waveband irrespective of polarization;
a second polarizing filter positioned in the optical path downstream of the first polarizing filter, the second polarizing filter being configured to receive the first subset of EMR and to transmit a second subset of EMR comprising EMR in the second waveband that has a second polarization orientation and the EMR in the first waveband that has the first polarization orientation, wherein the first polarization orientation comprises a linear orientation that is 90 degrees from a linear orientation of the second polarization orientation;
a third polarizing filter positioned in the optical path, the third polarizing filter being configured to receive the second subset of EMR and to transmit a third subset of EMR comprising EMR in a third waveband that has a third polarization orientation and to transmit the EMR in the first waveband that has the first polarization orientation and the EMR in the second waveband that has the second polarization orientation, wherein the third polarization orientation comprises a linear orientation that is 45 degrees from the linear orientation of the first polarization orientation and 45 degrees from the linear orientation of the second polarization orientation;
a fourth polarizing filter positioned in the optical path, the fourth polarizing filter being configured to receive the third subset of EMR and to transmit a fourth subset of EMR comprising EMR in a fourth waveband that has a fourth polarization orientation and to transmit the EMR in the first waveband that has the first polarization orientation, the EMR in the second waveband that has the second polarization orientation, and the EMR in the third waveband that has the third polarization orientation, wherein the third polarization orientation comprises the linear orientation that is 45 degrees from the linear orientation of the first polarization orientation and 45 degrees from the linear orientation of the second polarization orientation, and wherein the fourth polarization orientation comprises a linear orientation that is 45 degrees from the linear orientation of the first polarization orientation, 45 degrees from the linear orientation of the second polarization orientation, and 90 degrees from the linear orientation of the third polarization orientation; and
a sensor device comprising a plurality of detector elements sensitive to EMR in the first waveband, EMR in the second waveband, EMR in the third waveband, and EMR in the fourth waveband, the sensor device configured to distinguish the EMR in the first waveband from the EMR in the second waveband, the EMR in the third waveband, and the EMR in the fourth waveband.

22. A system comprising:
an optical device having an optical path, the optical device comprising:
a first polarizing filter positioned in the optical path, the first polarizing filter being configured to receive first electromagnetic radiation (EMR) from a scene and to transmit a first subset of EMR comprising EMR in a first waveband that has a first linear polarization orientation and EMR in a second waveband irrespective of polarization;
a second polarizing filter positioned in the optical path downstream of the first polarizing filter, the second polarizing filter being configured to receive the first subset of EMR and to transmit a second subset of EMR comprising EMR in the second waveband that has a second linear polarization orientation, the EMR in the first waveband that has the first linear polarization orientation, and EMR in a third waveband irrespective of polarization, the second linear polarization orientation being +60 degrees from the first linear polarization orientation;
a third polarizing filter positioned in the optical path, the third polarizing filter being configured to receive the second subset of EMR and to transmit a third subset of EMR comprising EMR in a third waveband that has a third linear polarization orientation and to transmit the EMR in the first waveband that has the first linear polarization orientation and the EMR in the second waveband that has the second linear polarization orientation, the third linear polarization orientation being −60 degrees from the first linear polarization orientation;
a sensor device comprising a plurality of detector elements sensitive to EMR in the first waveband, EMR in the second waveband, and EMR in the third waveband, the sensor device configured to distinguish the EMR in the first waveband from the EMR in the second waveband, and the EMR in the third waveband.

* * * * *